(12) United States Patent
Saraswat et al.

(10) Patent No.: US 12,255,769 B2
(45) Date of Patent: Mar. 18, 2025

(54) DISASTER RECOVERY PIPELINE FOR BLOCK STORAGE AND DEPENDENT APPLICATIONS

(71) Applicant: Nutanix, Inc., San Jose, CA (US)

(72) Inventors: Kartik Saraswat, Uttar Pradesh (IN);
Param Mangal, Bengaluru (IN);
Sandeep Ashok Ghadage, Sangli (IN);
Shubham Singh, Uttar Pradesh (IN);
Sudish Kumar Sah, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 352 days.

(21) Appl. No.: 17/969,399

(22) Filed: Oct. 19, 2022

(65) Prior Publication Data
US 2024/0036988 A1    Feb. 1, 2024

(30) Foreign Application Priority Data
Jul. 28, 2022    (IN) .............................. 202241043330

(51) Int. Cl.
*H04L 41/0663*    (2022.01)
*G06F 9/455*    (2018.01)
(Continued)

(52) U.S. Cl.
CPC ...... *H04L 41/0663* (2013.01); *G06F 9/45558* (2013.01); *G06F 11/2041* (2013.01);
(Continued)

(58) Field of Classification Search
CPC ............. H04L 41/0663; H04L 41/0846; G06F 9/45558; G06F 11/2041; G06F 2009/45583; G05F 2201/84
See application file for complete search history.

(56) References Cited

U.S. PATENT DOCUMENTS

| 8,549,518 B1 | 10/2013 | Aron et al. |
| 8,601,473 B1 | 12/2013 | Aron et al. |

(Continued)

OTHER PUBLICATIONS

Alshammari et al., "Disaster Recovery in single-cloud and multi-cloud environments: Issues and Challenges", 2017 4th IEEE International Conference on Engineering Technologies and Applied Sciences, Nov. 29, 2017.*

(Continued)

*Primary Examiner* — Todd L Barker
(74) *Attorney, Agent, or Firm* — Cesari and McKenna, LLP

(57) ABSTRACT

A recovery orchestration pipeline has stages configured to control efficient failover and recovery of applications in a multi-site disaster recovery (DR) environment. The applications run on user virtual machines (UVMs) at a primary site of the DR environment and connect to block storage devices (BSDs) that export virtual disks over a storage protocol to consume data including a recovery plan for disaster recovery. The recovery plan includes a recovery configuration whose generation is triggered by a user via a graphical user interface (GUI) and specifies resource requirements needed to recover the applications at a secondary site in the event of a disaster. The orchestration pipeline is initiated via single click of the GUI and completion of the stages of the pipeline is displayed as progress via the GUI to allow recovery of the applications without user intervention.

28 Claims, 11 Drawing Sheets

(51) Int. Cl.
  *G06F 11/20*    (2006.01)
  *H04L 41/084*   (2022.01)
(52) U.S. Cl.
  CPC ............... *H04L 41/0846* (2013.01); *G06F 2009/45583* (2013.01); *G06F 2201/84* (2013.01)

(56) References Cited

U.S. PATENT DOCUMENTS

| | | |
|---|---|---|
| 8,850,130 B1 | 9/2014 | Aron et al. |
| 8,863,124 B1 | 10/2014 | Aron et al. |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 10,877,851 B2* | 12/2020 | Mitkar ................ G06F 11/3055 |
| 11,574,050 B2* | 2/2023 | Bhagi ................... G06N 20/00 |
| 11,954,513 B2* | 4/2024 | Mahajan ............. G06F 11/1469 |
| 2023/0251945 A1* | 8/2023 | Polimera ............ G06F 11/1451 714/6.3 |

OTHER PUBLICATIONS

Suguna et al, "Overview of data backup and disaster recovery in cloud", International Conference on Information Commuincation and Embedded Systems, Feb. 27, 2014.*

Cano, Ignacio, "Curator: Self-Managing Storage for Enterprise Clusters" University of Washington; published Mar. 2017; pp. all.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 2020 pp. all.

* cited by examiner

DISASTER RECOVERY PIPELINE FOR BLOCK STORAGE AND DEPENDENT APPLICATIONS

CROSS-REFERENCE TO RELATED APPLICATIONS

The present application claims the benefit of India Provisional Patent Application Serial No. 202241043330, which was filed on Jul. 28, 2022, by Kartik Saraswat, et al. for DISASTER RECOVERY PIPELINE FOR BLOCK STORAGE AND DEPENDENT APPLICATIONS, which is hereby incorporated by reference.

BACKGROUND

Technical Field

The present disclosure relates to failover of applications and, more specifically, to application failover in a multi-site disaster recovery environment.

Background Information

Application failover generally involves copying or replicating data among applications executing on datacenters to enable continued operation of data processing operations in a data replication environment, such as disaster recovery (DR). The DR environment typically includes two or more datacenters, i.e., sites, which are often geographically separated by relatively large distances and connected over a communication network, e.g., a wide area network. The applications may access data, e.g., shares, via access controls over secured communication channels, such as internet Small Computer Systems Interface (iSCSI), using separate credentials for each share. Access to the share typically requires a shared secret between an application and an iSCSI server. The shared secret is usually stored in a central location, such as a common or central key store, of a datacenter having a plurality of nodes executing the applications and interconnected as a cluster. However, in a multi-site DR environment with geographically dispersed datacenters (sites), there typically is no central key store shared among the sites to support transparent failover of applications across sites to access data protected by encryption and/or credentials.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a recovery orchestration pipeline having stages configured to control (orchestrate) efficient failover and recovery of applications in a multi-site disaster recovery (DR) environment. The applications run on user virtual machines (UVMs) at a primary site of the DR environment and connect to block storage devices (BSDs) that export virtual disks or file systems over a storage protocol that may involve authentication (access control) and encryption to consume data that includes a recovery plan for disaster recovery. The recovery plan includes a recovery configuration that is generated by an administrator (user) via (i.e., trigged by) a graphical user interface (GUI) and specifies resource requirements (e.g., processor, memory, network, and storage capacity) needed to recover the applications at a secondary site in the event of a disaster. Based on the recovery configuration, the orchestration pipeline performs automated recovery of specified virtual machines and applications at a failover site including authentication (e.g., appropriate credentials for access control) and encryption (e.g., appropriate keys) needed for re-establishing communication to specified virtual disks and file systems. Notably, the orchestration pipeline is initiated via single click of the GUI and completion of the stages of the pipeline is displayed as progress via the GUI to allow recovery of the applications without user intervention.

DESCRIPTION

Figure 1:
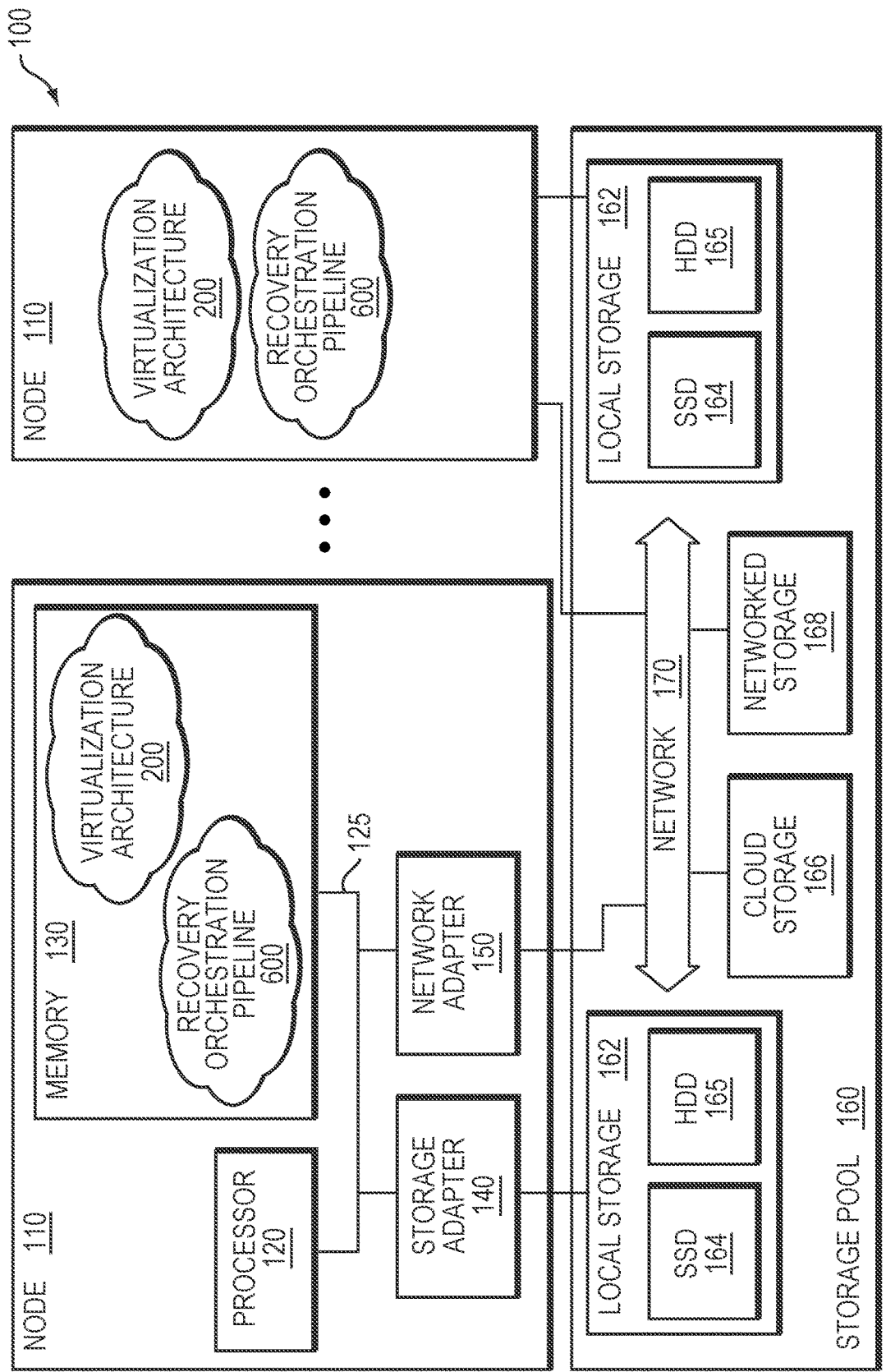
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage items, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, while other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software that provides virtualization architecture 200, and manipulate the data structures. The virtualization architecture 200 enables each node 110 to execute (run) one or more virtual machines that write data to the unified storage pool 160 as if they were writing to a SAN. As described herein, the virtualization architecture 200 also provides a recovery orchestration pipeline 600 deployable on one or more of the nodes 110 (or deployable centrally to the cluster on a single node) having stages configured to control (orchestrate) efficient failover and recovery of applications in a multi-site disaster recovery (DR) environment.

It will be apparent to those skilled in the art that other types of processing elements, including central processing units (CPUs) and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, engines, and/or modules consisting of hardware, software, firmware, or combinations thereof.

Figure 2:
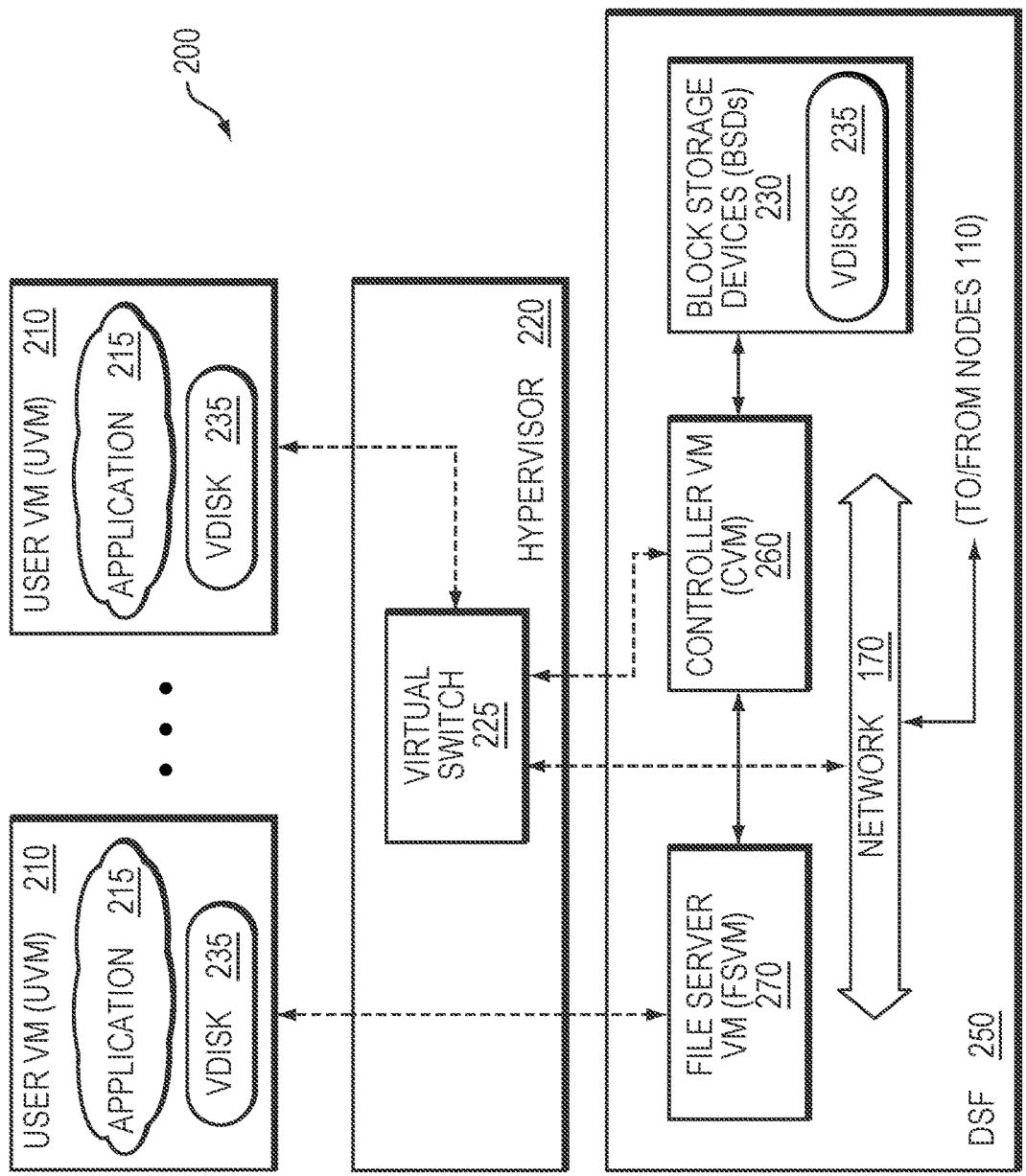
FIG. 2 is a block diagram of a virtualization architecture executing on a node to implement the virtualization environment.

FIG. 2 is a block diagram of the virtualization architecture 200 executing on a node of the cluster. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and one or more applications 215 running in the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 260, which functions as a virtual controller for SOCS. The CVMs 260 on the nodes 110 of the cluster 100 interact and cooperate to form a distributed data processing system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

A file server virtual machine (FSVM) 270 is a software component that provides file services to the UVMs 210 including storing, retrieving and processing I/O data access operations requested by the UVMs 210 and directed to data stored on the DSF 250. The stored data may be represented as a set of storage items, such as files organized in a hierarchical structure of folders (also known as directories), which can contain files and other folders, as well as shares, which can also contain files and folders. Illustratively, the FSVM 270 may communicate with storage resources, such as block storage devices (BSDs) 230, provided by CVM 260 to store and retrieve files, folders, SMB shares, or other storage items stored on storage pool 160. The FSVM 270 may also store and retrieve block-level data, including block-level representations of the storage items, on the BSDs 230 of the storage pool 160.

The client software (e.g., applications 215) running in the UVMs 210 may access the DSF 250 using filesystem protocols, such as the network file system (NFS) protocol, the server message block (SMB) protocol, the common internet file system (CIFS) protocol, and, illustratively, the internet small computer system interface (iSCSI) protocol. Operations on these filesystem protocols are interposed at the hypervisor 220 and may be forwarded to the FSVM 270, which cooperates with the CVM 260 to perform the operations on data stored on local storage 162 of the storage pool 160. The CVM 260 may export one or more iSCSI, CIFS, or NFS targets organized from the storage items in the storage pool 160 of DSF 250 to appear as BSDs 230 to the UVMs 210. These targets are virtualized, e.g., by software running on the CVMs, and exported as virtual disks (vdisks) 235 to the UVMs 210. In some embodiments, the vdisk is exposed via iSCSI, SMB, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a BSD 230 via a CVM 260 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. A virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 260 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 260 within the same node as the UVM 210, then the IP-based storage protocol request is internally forwarded within the node to the CVM. The CVM 260 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 260 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 260 on that node for further processing.

Figure 3:
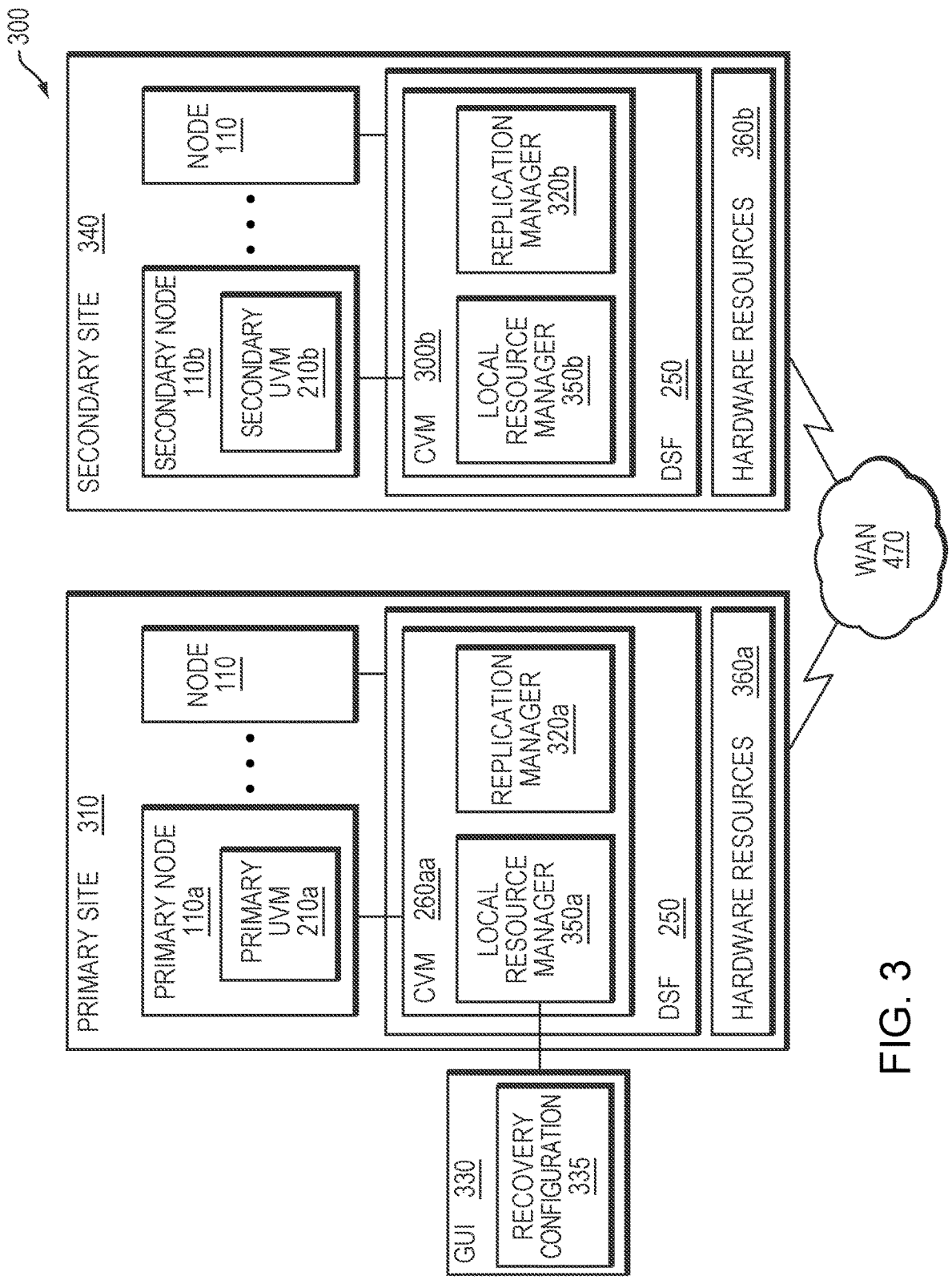
FIG. 3 is a block diagram of a disaster recovery (DR) environment configured to provide no loss failover of a virtual machine.

To prevent data loss and interruption of service in the event of a failure to one or more nodes of a cluster at a local geographic region, a virtual machine (such as a UVM) running on the failed node may be configured for failover to a failover node running at a remote geographic region in a multi-site DR environment. FIG. 3 is a block diagram of a multi-site disaster recovery (DR) environment 300 configured to provide no loss failover of a virtual machine. A virtual machine (e.g., primary UVM 210a) running on a primary node 110a at local geographic region (i.e., a primary site 310) may be configured for failover and recovery to a secondary UVM 210b running on a secondary (failover) node 110b at remote geographic region (e.g., secondary site 340) in the DR environment 300. In an embodiment, the primary and secondary sites are datacenters deployed as either on-premises (private) or cloud (public) sites.

Local resource managers 350a,b and replication managers 320a,b of CVMs 300a,b running at both sites, respectively, cooperate to provide the failover and recovery of the primary UVM 210a in the event of failure to primary node 110a. The local resource managers 350a,b allow users (administrators) to monitor and manage resources of the cluster via, e.g., a graphical user interface (GUI) 330. In an embodiment, the resources may include hardware resources 3600, e.g., memory storage capacity, networking capacity, and CPU processing capacity. The replication managers 320a,b are configured to provide replication and disaster recovery capabilities of DSF 250. Such capabilities include migration/failover of virtual machines and BSDs, as well as scheduling of snapshots. No loss failover/recovery of the primary UVM 210a is only possible if the secondary node 110b at the secondary site 340 has sufficient resources to resume operations in the same configuration as the primary UVM 210a. More specifically, the secondary site 340 requires sufficient hardware resources 360b (e.g., CPU processing capability, memory capacity, etc.) to accommodate a configuration update of the primary UVM 210a in the event of failover to secondary node 110b.

The embodiments described herein are directed to a recovery orchestration pipeline having stages configured to control (orchestrate) efficient failover and recovery of applications in a multi-site DR environment. The applications 215 run on UVMs 210 at primary site 310 of the DR environment 300 and connect to BSDs 230 that export vdisks 235 (or file systems) over a storage (e.g., iSCSI) protocol to consume data that includes a recovery plan for disaster recovery. The recovery plan includes a recovery configuration 335 whose generation is triggered by an administrator (user) via the GUI 330 and specifies resource requirements (e.g., processor/CPU, memory, network, and storage capacity) needed to recover the applications at secondary site 340 in the event of a disaster. Based on the recovery configuration, the orchestration pipeline performs automated recovery of specified virtual machines and applications at a failover site including authentication (e.g., appropriate credentials for access control) and encryption (e.g., appropriate keys) needed for re-establishing communication to specified virtual disks and file systems. Notably, the recovery orchestration pipeline 600 is initiated via single click of the GUI 330 by the user and completion of the stages of the pipeline 600 is displayed as progress via the GUI 330 to allow recovery of the applications 210 without user intervention.

Communication over the iSCSI connection requires a shared secret between each UVM application 210 and an iSCSI target (e.g., server) in order to access the recovery configuration on the BSD 230. In response to a disaster/failure, the shared secrets are used at secondary site 340 to recover the UVM applications 210 according to a predetermined boot sequence specified in the recovery configuration. Specifically, the secrets are used to authenticate each UVM application 210 to the iSCSI target serving data of the BSD 230 using an authentication protocol such as CHAP. Note that the shared secrets may also include encryption keys for decoding encrypted data at the target vdisk which is apart from any secure connection provided by iSCSI to the target vdisk.

Figure 4:
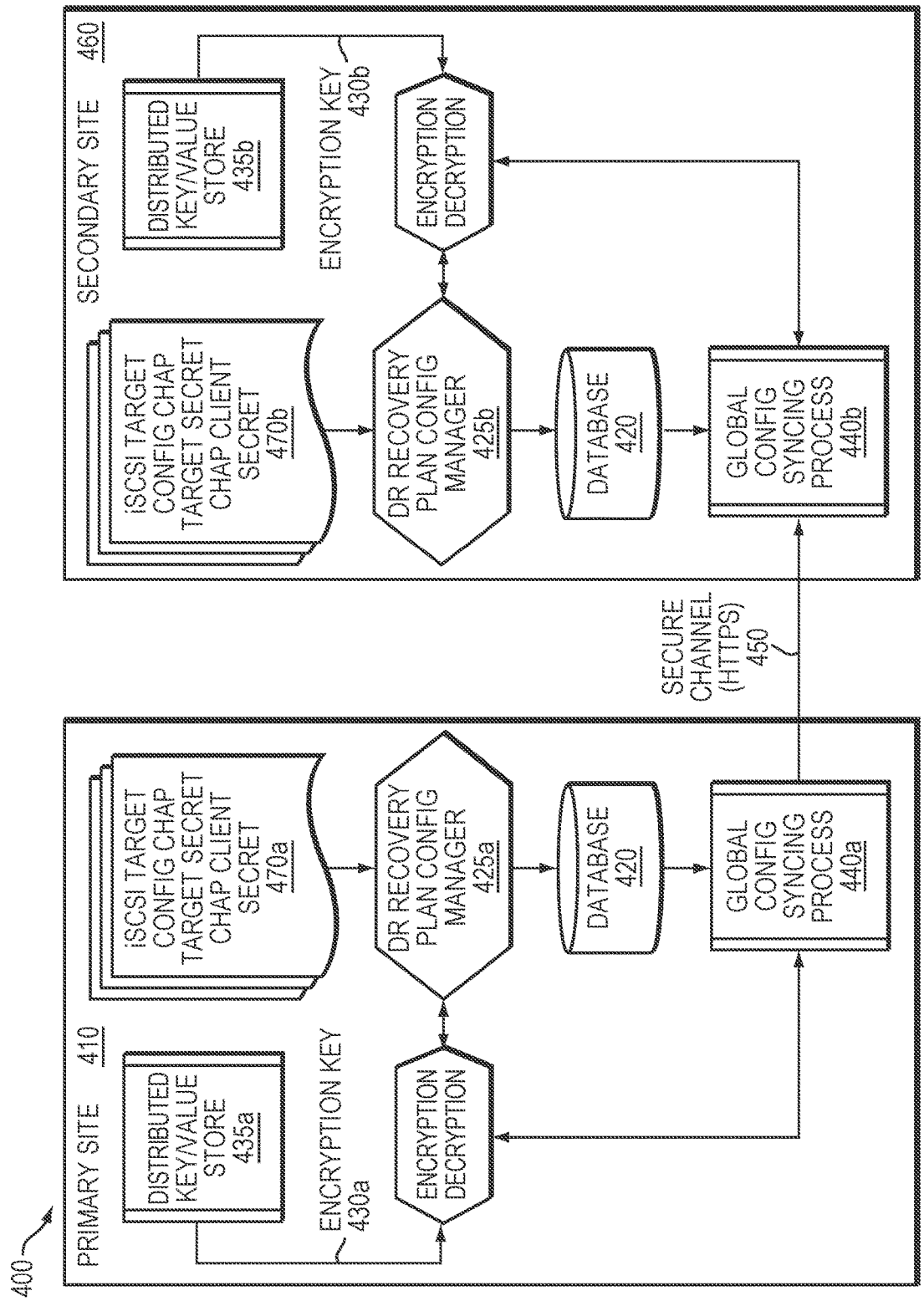
FIG. 4 is a block diagram of an exemplary DR environment that may be advantageously deployed with the embodiments described herein.

FIG. 4 is block diagram of an exemplary DR environment 400 that may be advantageously deployed with the embodiments described herein. A secure (e.g., HTTPs) side-band channel 450 may be employed to transmit the shared secrets and recovery configuration 335 (e.g., a secrets database 420) in clear-text from the primary site 410 to the secondary site 460, where the secrets database 420 is then re-encrypted with a different key. Two distinct encryption keys 430a,b local to each of the two sites are used to establish the secrets database 420 (in encrypted form) at the primary and secondary sites. In the event of a disaster (failure) at the primary site 410, the secrets are then used to automatically recover (bring-up) the UVM applications 210 and BSDs 230 on the secondary site 460 and establish communication between the UVMs and vdisks 235 including authentication and any needed data decryption. Notably, each UVM application instance and connection to a vdisk, e.g., mount of a BSD, has its own key access (authentication) that needs to be recovered transparently to an application (user) via a single-click of the GUI 330.

In an embodiment, local encryption key 430a is generated by a DR recovery plan configuration manager 425a to encrypt secrets that are stored in a storage repository, e.g., distributed key-value (DKV) store 435a. A recovery plan contains the recovery configuration 335 including information (e.g., CPU, memory, network, and storage capacity) needed to recover the UVM applications 210 at a secondary site in the event of a disaster. The recovery configuration 335 is illustratively provided by an administrator (user) via the GUI 330 which encodes the recovery configuration in, e.g., eXtensible Markup Language (XML), by generating a (XML) file. On recovery, the generated file is parsed to extract the configuration. The recovery configuration 335 (file) is stored in the secrets database 420 local to the primary site 410.

A global configuration syncing (GCS) process 440a executing on a node 110 at the primary site 410 establishes the secure communication channel, e.g., HTTPs, 450 with its GCS peer 440b at the secondary site 460. The GCS process 440a retrieves and decrypts the shared secrets stored in the DKV store 435a and sends the decrypted secrets along with the recovery configuration 335 from the database 420 over the secure channel 450 to the secondary site 460. Note that the GCS sync may occur periodically or at a detected change of the database at the primary site. The GCS peer process 440b executing on a node of the secondary site receives and stores the decrypted secrets in memory of the node and encrypts the secrets with an encryption key 430b local to the secondary site 460. Note that the encryption keys local to the primary and secondary sites are different. The shared encrypted secrets are stored in the DKV store 435b local to the secondary site and the recovery configuration is stored in a database local to the secondary site. The secrets are thereafter used to enable communication between the recovered UVM applications 210 and BSDs 230 in accordance with appropriate authentication protocols, e.g., CHAP client and target secrets.

In an embodiment, each site of the DR environment 400 is provided with a protection policy specifying a data protection arrangement for protected entities, such as UVM applications 210, executing on the primary site and communicating with BSDs via, e.g., iSCSI, or with other applications, such as databases, over different networks. The data protection arrangement involves data replication, such as synchronous or asynchronous replication, of protected entities from the primary site 410 to the secondary site 460. Note that asynchronous replication may involve generation of snapshots for the protected entities that are transmitted from the primary site to the secondary site.

Figure 5:
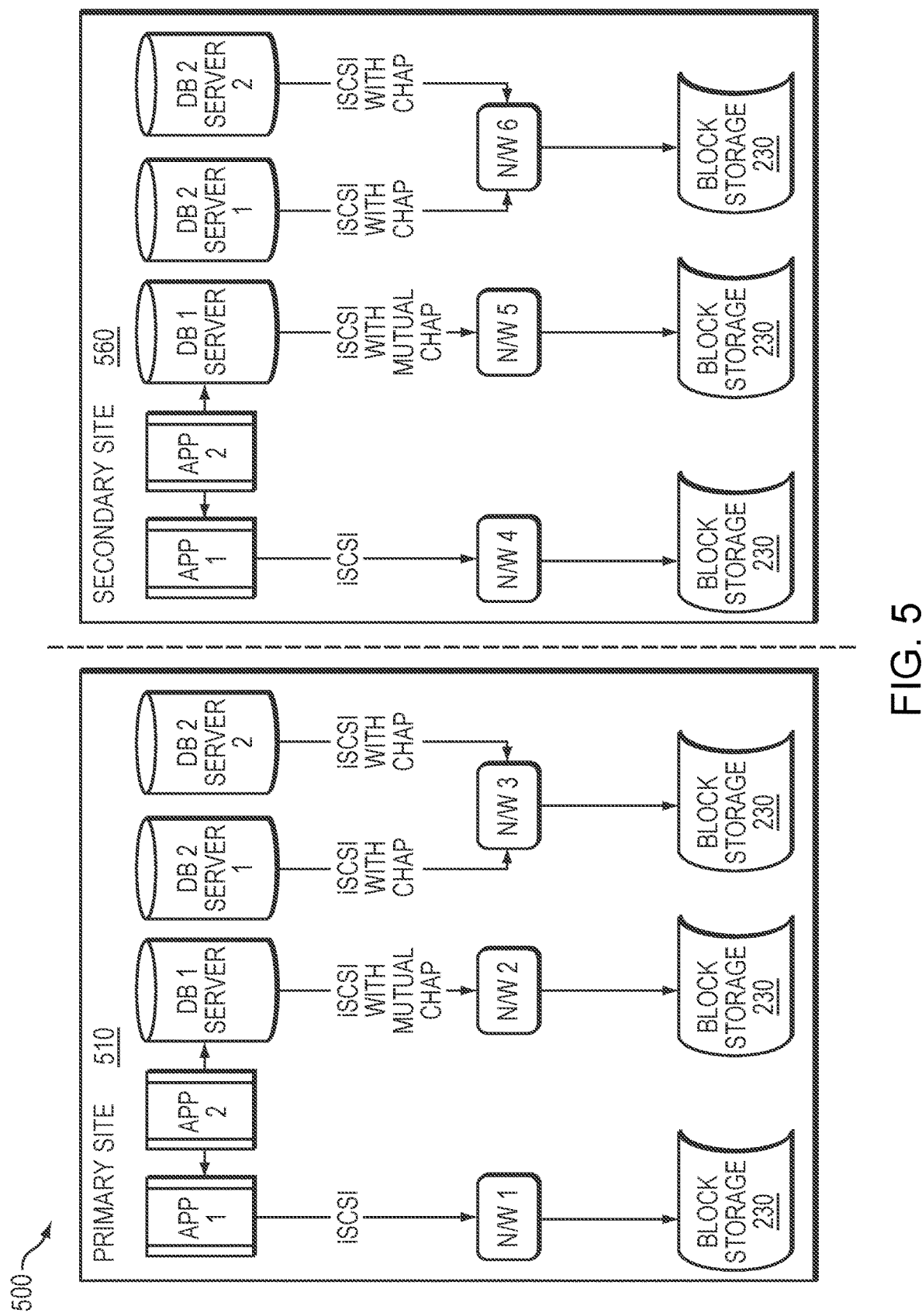
FIG. 5 is a block diagram of another exemplary DR environment that may be advantageously deployed with the embodiments described herein.

FIG. 5 is a block diagram of another exemplary DR environment that may be advantageously deployed with the embodiments described herein. The multi-site DR environment 500 includes UVM applications 210 (e.g., app1 and app2) running on primary site 510. App1 communicates with an associated BSD 230 using the iSCSI protocol over a network, e.g., N/W 1. App1 and app2 also communicate with associated database servers (DB1 and DB2 servers), which are connected to associated BSDs 230 over different networks, e.g., N/W2 and N/W3 on the primary site 510. According to the technique, the UVM and BSD associations are persisted over to secondary site 560 using desired networking and network segmentation. As such, App1 communicates with an associated BSD 230 using the iSCSI protocol over a network, e.g., N/W 4. App1 and app2 also communicate with associated DB1 and DB2 servers, which are connected to associated BSDs 230 over different networks, e.g., N/W5 and N/W6 on the secondary site 560. In addition, the CHAP authentication configuration is persisted over to secondary site 560. Once the UVMs are powered on, the iSCSI BSDs are accessible to the applications. The recovery configuration contains information needed to establish connection for each type of entity, e.g., databases via HTTPs and vdisks via iSCSI. Notably, administrators (users) do not need to perform any manual configuration to the recovered UVMs, BSDs or network configuration on the secondary site to ensure that the applications are up and running.

Figure 6:
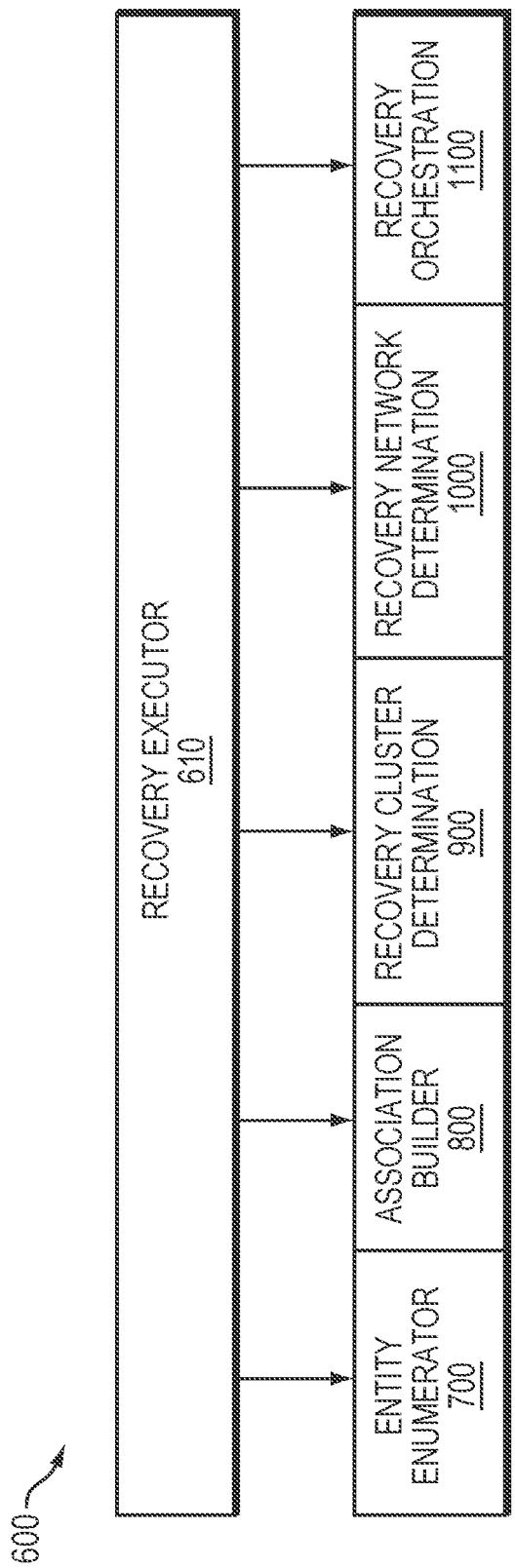
FIG. 6 is a block diagram a recovery orchestration pipeline.

FIG. 6 is a block diagram of the recovery orchestration pipeline 600. In an embodiment, the pipeline 600 is organized as various stages including an entity enumeration stage 700, an association builder stage 800, a recovery cluster determination stage 900, a recovery network determination stage 1000, and a recovery orchestration stage 1100. The staged pipeline 600 is illustratively implemented by a DR orchestration service of the virtualization architecture 200 configured to control (orchestrate) application failover in a multi-site DR environment via the stages of the pipeline. The DR orchestration service may be embodied as a script that controls high-level administrative orchestration of failover in cooperation with different hypervisors and different backend storage infrastructures, such as various types of BSDs and snapshots. Illustratively, the DR orchestration service includes a recovery executor 610 configured to execute the stages of the recovery pipeline 600 using, e.g., application programming interfaces to configure applications (UVMs) and data (BSDs) migrated from a primary site to a secondary site of the DR environment in accordance with a recovery configuration.

Figure 7:
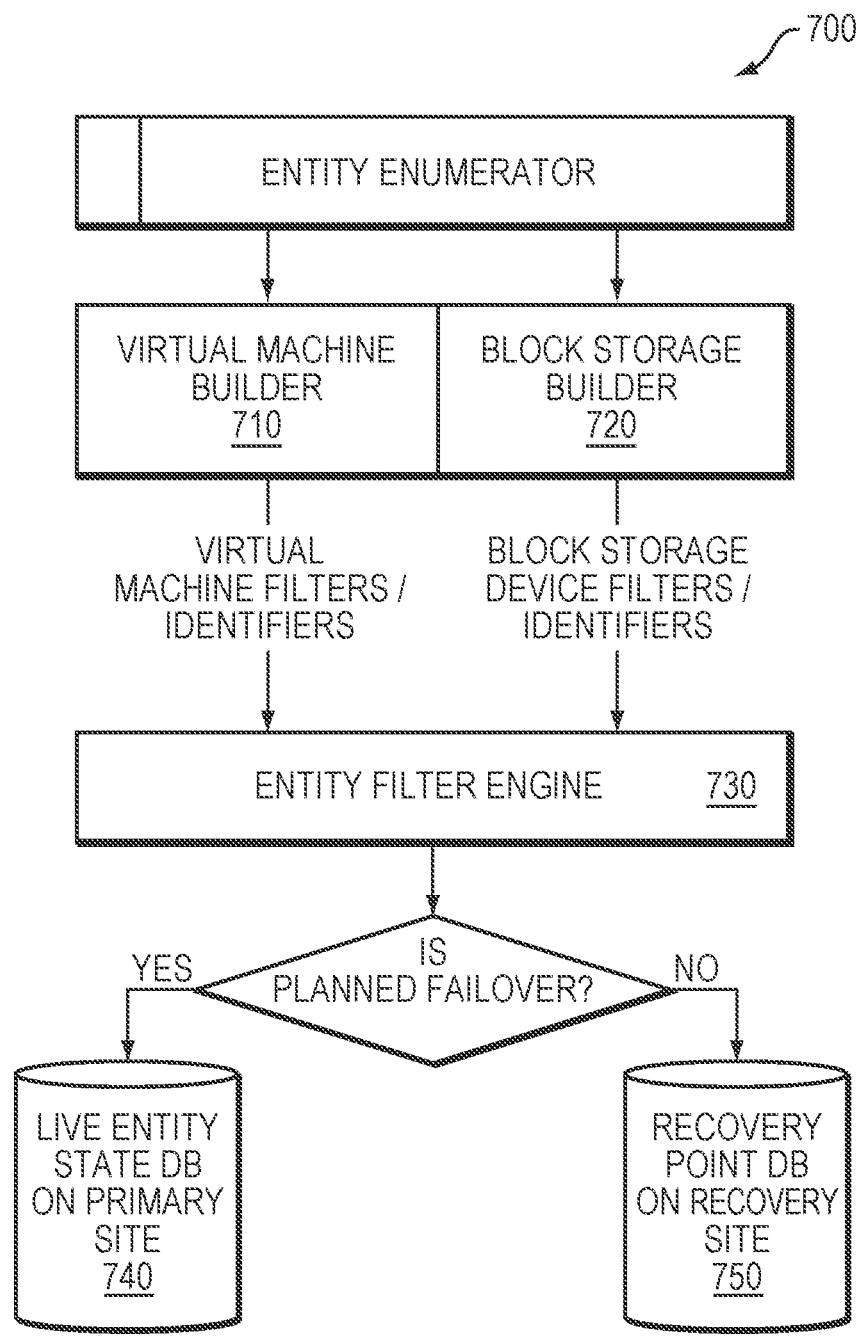
FIG. 7 is a block diagram of an entity enumeration stage of the recovery orchestration pipeline.

FIG. 7 is a block diagram of the entity enumeration stage 700 of the recovery orchestration pipeline 600. In an embodiment, the entity enumeration stage 700 determines the entities (e.g., UVM applications and BSDs) involved with failover and requiring recovery at the secondary site. Each entity may be specified by name and/or identifier (ID), as well as category, e.g., a department of an organization. Specification of a recovery category may automatically (i.e., without user intervention) enumerate all entities (such as UVM applications, DB servers and networks) associated with the category. A virtual machine builder 710 and a block storage builder 720 separate the entities by type and determine the entities (e.g., appropriate UVMs and BSDs, respectively) using filters, e.g., identifiers. Depending on whether the failover recovery is a planned or unplanned failover, an entity filter engine 730 is configured to automatically select the entities for recovery by applying the filters in accordance with the recovery configuration 335. In the case of a planned failover, the filter engine 730 searches a "live" entity state database 740 on the primary site for the entities and their live (i.e., actively running) states (e.g., UVM applications 210 that are currently running and their current snapshots) to enable recovery of the latest entity states at the secondary site. For an unplanned failover (disaster/failure), the filter engine 730 searches a recovery point database 750 on the secondary site for the appropriate entities. Illustratively, the recovery point database 750 is a periodically updated snapshot storage medium from the primary site used to recover UVMs (applications) and BSDs (data blocks) according to the recovery configuration.

In an embodiment, the filter engine 730 searches the databases to acquire (i) authentication configuration of the selected BSD specified in the recovery configuration, (ii) the iSCSI qualified name (iQN) of the selected BSD, and (iii) a list of iSCSI attached clients to the selected BSD. In addition, the filer engine 730 acquires the following detailed information from the guest operating system for each selected UVM: (iv) guest operating system properties (platform, operating system version, supporting features), (v) iQN from the guest operating system, (vi) a list of active iSCSI attached BSDs, (vii) iQN names of each BSD to be attached to the selected UVM, (viii) iSCSI target server IP address used to connect to each BSD, and (ix) authentication configuration specified in the recovery configuration for each connected BSD. Notably, additional parameters may be stored to support supplemental features such as data encryption.

Figure 8:
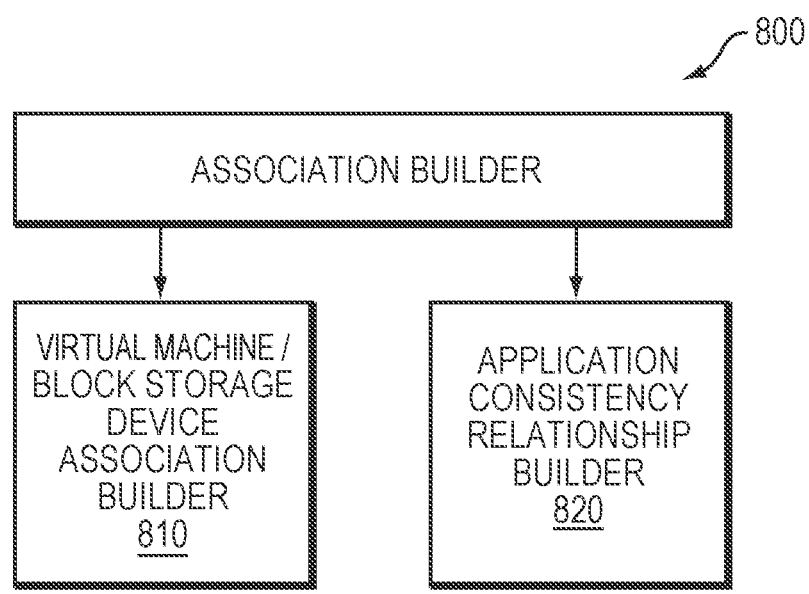
FIG. 8 is a block diagram of an association builder stage of the recovery orchestration pipeline.

FIG. 8 is a block diagram of the association builder stage 800 of the recovery orchestration pipeline 600. In an embodiment, the association builder stage 800 determines an association between each enumerated UVM and BSD according to the recovery configuration and builds the association (or mapping) using virtual machine/block storage device association builder 810 to essentially re-create the primary site configuration at the secondary site and enable communication between the UVM and appropriate BSD. To that end, the association builder 810 uses the information acquired for the BSDs and attachment information acquired for each UVM to build the mapping from UVM to list of BSD attachments needed to be performed upon recovery. Notably, the mapping is biased to providing connections between UVMs and BSD according to network interfaces to preserve expected network isolation and performance. Illustratively, the mapping includes a list of BSDs to be connected via direct hypervisor attachment and a list of BSDs to be connected via iQN based attachment. For each BSD with iQN attachment, the builder prepares a "payload," e.g., of information, with iQN name and attachment protocol/secrets to be used for attachment after power on. Note that UVM to BSD communication may be established using (i) CHAP authentication over an iSCSI network connection at the UVM level or (ii) using direct attachment of the UVM to a hypervisor emulated local disk, which then provides iSCSI redirection to the BSD.

The association builder further identifies which groups of entities (UVMs and BSDs) are associated with a same application (application group) using application consistency relationship builder 820. For example, a UVM 210 may require certain resources (i.e., CPU, memory, and networking) that are available on only certain nodes 110 of the datacenter clusters at the secondary site; therefore, the UVM may be able to run only on those nodes that can provide the needed resources. In an embodiment, the identifying information may be used to choose a snapshot employed to ensure consistency across all entities that are associated with (part of) the same application and assign placement of entities in the same application on the same secondary (recovery) cluster, as described further herein.

Figure 9:
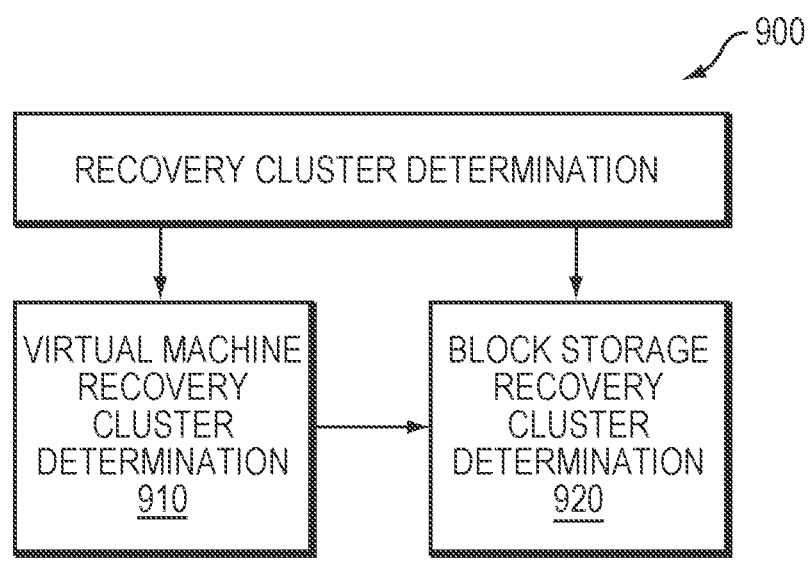
FIG. 9 is a block diagram of a recovery cluster determination stage of the recovery orchestration pipeline.

FIG. 9 is a block diagram of the recovery cluster determination stage 900 of the recovery orchestration pipeline 600. In an embodiment, the recovery cluster determination stage 900 determines a target recovery location for each entity (UVM, BSD) based on recovery locations specified by the recovery configuration 335. The protection policy for the DR environment may specify replication of snapshots to a particular recovery location (cluster); accordingly, snapshots of the UVM may be present on only certain clusters of the secondary site. The recovery cluster determination stage 900 is configured to direct placement of entities on an appropriate node of the appropriate recovery cluster at the secondary site. For example, placement of a UVM is determined in accordance with virtual machine recovery cluster determination (logic) 910 and placement of a BSD is determined in accordance with block storage recovery cluster determination (logic) 920. In the event of a mismatch of entities-to-recovery cluster, the user is provided with a GUI warning and is allowed to determine a preferred placement of the entities, which may necessitate migration of UVMs and/or BSDs to the appropriate recovery cluster. For direct attachment communication among the entities, the UVM should be present on the recovery cluster as the hypervisor network routing may be limited for establishing connections to target vdisk within the cluster. For iQN based attachments at the UVM level, the recovery cluster for the UVM should have the network interfaces needed to connect (i.e., route) to the iSCSI server running at the secondary site preferably on the recovery cluster.

Figure 10:
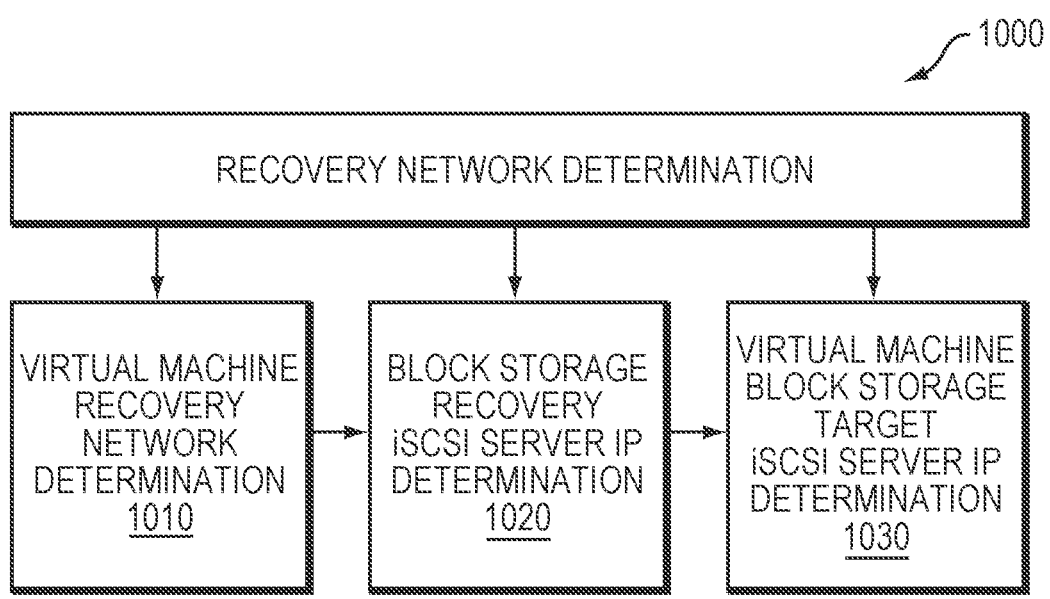
FIG. 10 is a block diagram of the recovery network determination stage of the recovery orchestration pipeline.

Each UVM application requires communication access over a network to an associated BSD. FIG. 10 is a block diagram of the recovery network determination stage 1000 of the recovery orchestration pipeline 600. In an embodiment, the recovery network determination stage 1000 performs (i) virtual machine recovery network determination 1010, (ii) block storage recovery iSCSI server IP determination 1020, and (iii) virtual machine-block storage target iSCSI server IP determination 1030 to essentially determine the network interfaces to which the UVM is attached upon recovery based on a network mapping provided in the recovery configuration 355. Note that the recovery information is intended to provide reachability of a BSD from a UVM but may not be optimal due to differences in network layout at the secondary site or recovery cluster. To that end, the administrator (user) may configure certain network interfaces as specified in the recovery configuration. For example, a single network interface may be dedicated (by default) to enable UVM access (UVM applications) to a BSD or multiple network interfaces may be specified to provide higher network bandwidth (or even network isolation) for certain UVM applications.

For further illustration, refer again to the exemplary DR environment 500 shown in FIG. 5. Network interfaces 1-3 on the primary site 510 are configured to connect to the appropriate BSDs. Yet on the secondary site 560, network interfaces 4-6 are configured to connect to the appropriate BSDs. The network mapping between the primary and secondary site network interfaces is specified in the recovery configuration 335. Note that for each iQN based attachment between a UVM and BSD that uses an iSCSI server IP address X on the primary site, the mapping specified in the recovery configuration for iSCSI server IP address X is used on the secondary site so as to maintain expected network isolation and performance. For example, iSCSI (DB2) servers 1-2 are isolated from other network access over network/network interface 3 on the primary site; the recovery configuration ensures the same mapping on the secondary site by configuring network/network interface 6. Although the actual characteristics of the networks/interfaces may be different, the mapping accommodates those differences in order to achieve performance/network isolation according to the recovery configuration.

Figure 11:
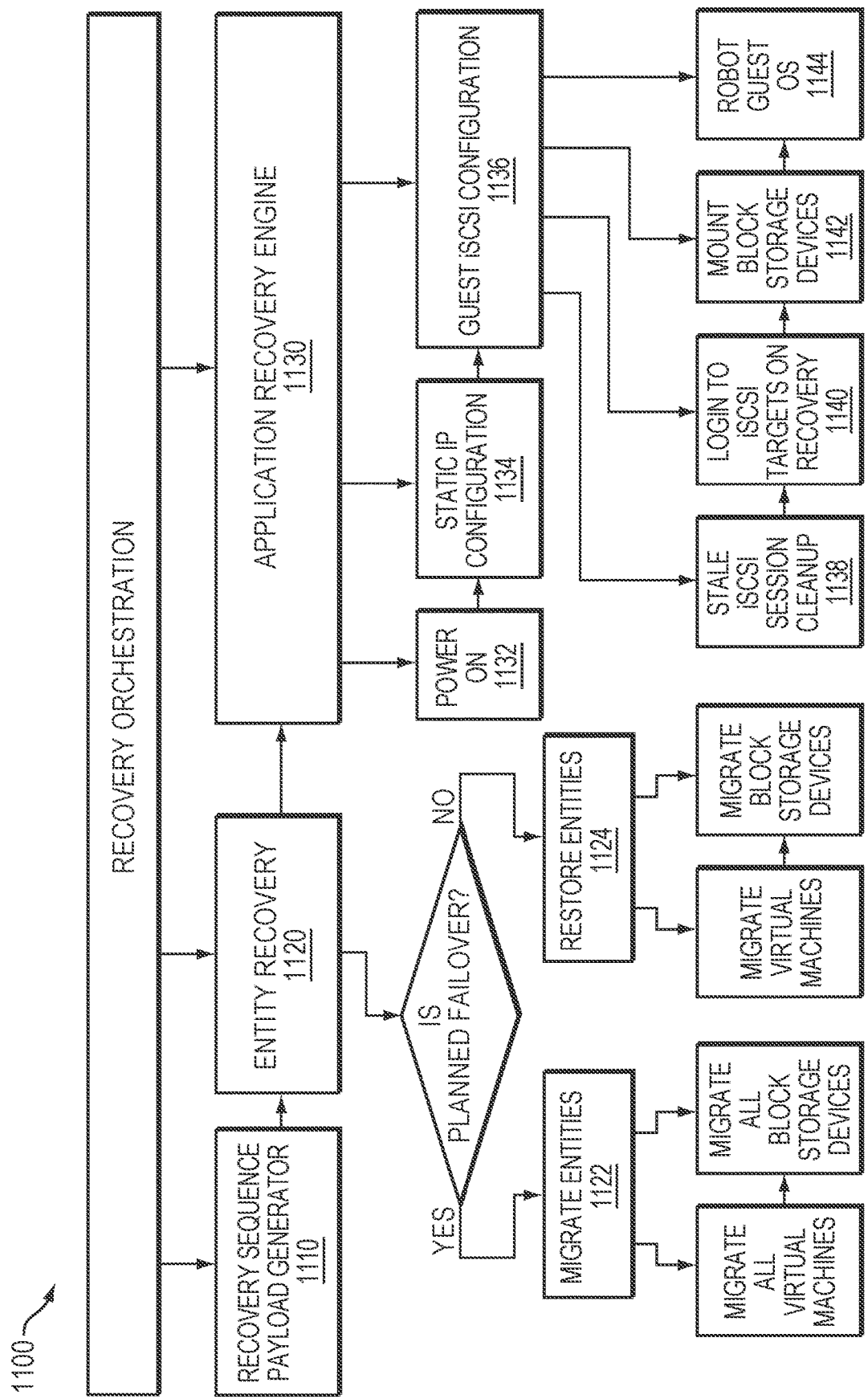
FIG. 11 is a block diagram of a recovery orchestration stage of the recovery orchestration pipeline.

FIG. 11 is a block diagram of the recovery orchestration stage 1100 of the recovery orchestration pipeline 600. At this stage of the pipeline, the recovery executor 610 has acquired and processed all the information needed for recovery of entities at the secondary site, including necessary mappings of UVM applications to BSDs. A recovery sequence payload generator 1110 of the recovery orchestration stage 1100 creates a payload relating to each entity. For example, the payload for each BSD to be recovered includes (a) iQN name used on the secondary site; (b) preserved authentication configuration such as (i) target secret, (ii) authentication protocol, and (iii) block storage devices to be recovered. For each UVM having a BSD attachment that is recovered on the secondary site, the payload includes (c) a generated iQN name used on the secondary site; and (d) a list of identifiers for associated BSDs on the primary site. Moreover, for each associated BSD, the payload includes (e) authentication configuration such as (i) client secret and (ii) authentication protocol; (f) iQN name used on the secondary site; and (g) iSCSI server IP address used on the secondary site to connect to the associated BSD.

An entity recovery engine 1120 of the recovery orchestration stage 1100 then begins recovering (e.g., powering on) the identified entities in sequence (e.g., one-at-a-time) according to a predetermined "boot sequence" order provided in the recovery configuration. If recovery is a planned failover, all UVMs are first powered down at the primary site, migrated to the secondary site (migrate entities 1122) and then powered up at the secondary site prior to migrating all BSDs to ensure graceful migration from the primary site to the secondary site. However, if recovery is triggered because of a primary site failure (unplanned failover), then all BSDs are restored from snapshots (e.g., by restore engine 1124) first followed by all UVMs. Note that restoration of the BSDs from snapshots occurs from the recovery point database 750. The UVMs that are directly attached a hypervisor are also connected to the BSDs.

An application recovery engine 1130 then powers-on 1132 the UVM applications in the predetermined boot sequence order provided in the recovery configuration 335. For each UVM, the application recovery engine 1130 configures network IP addresses (static IP configuration 1134) according to the recovery configuration. In the event a crashed UVM is recovering from a failure, guest iSCSI configuration 1136 is affected using an agent service running inside a guest operating system of the UVM (or directly communicating with the guest operating system). In this context, guest iSCSI configuration includes (i) configuring a desired iQN name for the UVM and (ii) cleaning-up any stale iSCSI sessions 1138. Since the association of the UVM application to BSD is known, the agent service may login to the iSCSI targets 1140 to (iii) setup a connection to the iSCSI targets and (iv) connect/mount the BSDs 1142 to the UVM. The agent service may then (v) perform a guest operating system reboot 1144 to ensure clean bootstrapping, e.g., for complex applications.

Advantageously, the stages of the recovery orchestration pipeline cooperate to provide efficient failover and recovery of applications including their associated entities (UVMs and BSDs) and their interdependencies in a multi-site DR environment. To that end, each stage builds and updates the recovery configuration to generate association relationships for related UVM applications and BSDs to ensure end-to-end application failover recovery. The pipeline ensures translation of environment specific configurations, such as iSCSI target connection, network interfaces, and IP address, are applied to recovered applications. In addition, information acquired and processed at each pipeline stage is persisted to avoid rebuild in the event the pipeline is restarted due to service failure. Moreover, the DR orchestration service implementing the recovery orchestration pipeline is hypervisor agnostic and independent of backend storage infrastructures to enable deployment of the service on a variety of storage platforms in a DR environment.

The foregoing description has been directed to specific embodiments. It will be apparent however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for orchestrating application failover in a multi-site disaster recovery (DR) environment comprising:
   enumerating entities associated with the failover from a primary site to a secondary site of the DR environment by application at the primary site, the entities including one or more user virtual machines (UVMs), block storage devices (BSDs) requiring authenticated access, and network interfaces;
   connecting, at the secondary site, each UVM to an associated BSD via a network interface by application according to a recovery configuration to enable authenticated UVM access to data of the BSD at the secondary site, wherein generation of the recovery configuration is triggered from a graphical user interface (GUI); and
   powering on, at the secondary site, the UVMs and BSDs in a predetermined boot sequence according to the recovery configuration to enable recovery of the application without user intervention, wherein execution of the application failover is initiated via the GUI and completion of the application failover is displayed as progress via the GUI.

2. The method of claim 1 further comprising:
   retrieving the recovery configuration stored in an encrypted database at the primary site; and
   sending the recovery configuration as clear text via a secure channel to the secondary site, wherein the recovery configuration includes credentials for authenticating access to the BSDs.

3. The method of claim 1 further comprising:
   building a mapping from each UVM to a respective list of BSDs configured for attachment upon recovery at the secondary site, wherein the mapping is biased to provide connections between the UVMs and BSDs according to the network interfaces to preserve expected network isolation and performance.

4. The method of claim 1, wherein the recovery configuration is a periodically updated snapshot storage medium from the primary site to the secondary site.

5. The method of claim 1, wherein recovery of the application includes authenticating access to the BSD from the UVM to emulate a local disk for the application.

6. The method of claim 1, wherein the recovery configuration includes (i) an authentication configuration of the BSDs specified in the recovery configuration, (ii) an iSCSI qualified name (iQN) of the specified BSDs, and (iii) a list of iSCSI attached clients to the specified BSDs.

7. The method of claim 1 further comprising:
generating a payload relating to each enumerated BSD entity, wherein a respective payload includes (i) an iSCSI qualified name (iQN) used at the secondary site, (ii) an authentication configuration, (iii) an authentication protocol, (iv) a block storage device to be recovered, and (v) an IP address of an iSCSI server used on the secondary site to connect to a respective BSD; and
using the payload to establish communication from the UVM at the secondary site to the iSCSI server to access the recovered block storage device.

8. The method of claim 1 further comprising:
generating a payload relating to each enumerated UVM entity, wherein the payload includes a generated iSCSI qualified name iQN used on the secondary site and a list of identifiers for associated BSDs on the primary site.

9. The method of claim 1 further comprising:
in response to an unplanned failover, recovering the BSDs at the secondary site from a recovery point snapshot at the secondary site periodically updated from the primary site.

10. The method of claim 1, wherein recovery of the application further comprises:
in response to recovery of a failed UVM, via an agent service running inside a guest operating system of the recovered UVM,
(i) cleaning-up one or more stale iSCSI sessions,
(ii) logging-in to iSCSI targets to establish connections from the UVMs to the BSDs, and
(iii) rebooting the guest operating system to ensure clean bootstrapping.

11. A non-transitory computer readable medium including program instructions for execution on a processor of a storage system, the program instructions configured to:
enumerate entities associated with a failover from a primary site to a secondary site of the DR environment by application at the primary site, the entities including one or more user virtual machines (UVMs), block storage devices (BSDs) requiring authenticated access, and network interfaces;
connect, at the secondary site, each UVM to an associated BSD via a network interface by application according to a recovery configuration to enable authenticated UVM access to data of the BSD at the secondary site, wherein generation of the recovery configuration is triggered from a graphical user interface (GUI); and
power on, at the secondary site, the UVMs and BSDs in a predetermined boot sequence according to the recovery configuration to enable recovery of the application without user intervention, wherein execution of the application failover is initiated via the GUI and completion of the application failover is displayed as progress via the GUI.

12. The non-transitory computer readable medium of claim 11, wherein the program instructions are further configured to:
retrieve the recovery configuration stored in an encrypted database at the primary site; and
send the recovery configuration as clear text via a secure channel to the secondary site, wherein the recovery configuration includes credentials for authenticating access to the BSDs.

13. The non-transitory computer readable medium of claim 11 wherein the program instructions are further configured to:
build a mapping from each UVM to a respective list of BSDs configured for attachment upon recovery at the secondary site, wherein the mapping is biased to provide connections between the UVM and BSDs according to the network interfaces to preserve expected network isolation and performance.

14. The non-transitory computer readable medium of claim 11 wherein the recovery configuration is a periodically updated snapshot storage medium from the primary site to the secondary site.

15. The non-transitory computer readable medium of claim 11 wherein recovery of the application includes authenticating access to the BSD at a hypervisor of the UVM to emulate a local disk for the application.

16. The non-transitory computer readable medium of claim 11 wherein the recovery configuration includes (i) an authentication configuration of the BSDs specified in the recovery configuration, (ii) an iSCSI qualified name (iQN) of the specified BSDs, and (iii) a list of iSCSI attached clients to the specified BSDs.

17. The non-transitory computer readable medium of claim 11, wherein the program instructions are further configured to:
generate a payload relating to each enumerated BSD entity, wherein a respective payload includes (i) an iSCSI qualified name (iQN) used at the secondary site, (ii) an authentication configuration, (iii) an authentication protocol, (iv) a block storage device to be recovered, and (v) an IP address of an iSCSI server used on the secondary site to connect to a respective BSD; and
use the payload to establish communication from the UVM at the secondary site to the iSCSI server to access the recovered block storage device.

18. The non-transitory computer readable medium of claim 11, wherein the program instructions are further configured to:
generate a payload relating to each enumerated UVM entity, wherein the payload includes a generated iSCSI qualified name (iQN) used on the secondary site and a list of identifiers for associated BSDs on the primary site.

19. The non-transitory computer readable medium of claim 11, wherein the program instructions are further configured to:
in response to an unplanned failover, recover the BSDs at the secondary site from a recovery point snapshot at the secondary site periodically updated from the primary site.

20. An apparatus comprising:
a disaster recovery (DR) manager configured to orchestrate application failover in a multi-site DR environment, the DR manager running on a node in a cluster of the DR environment and having a processor configured to execute program instructions to,
enumerate entities associated with the failover from a primary site to a secondary site of the DR environment by application at the primary site, the entities including one or more user virtual machines (UVMs), block storage devices (BSDs) requiring authenticated access, and network interfaces;
connect, at the secondary site, each UVM to an associated BSD via a network interface by application according to a recovery configuration to enable authenticated UVM access to data of the BSD at the secondary site, wherein generation of the recovery configuration is triggered from a graphical user interface (GUI); and
power on, at the secondary site, the UVMs and BSDs in a predetermined boot sequence according to the recovery configuration to enable recovery of the application without user intervention, wherein execution of the application failover is initiated via the GUI and completion of the application failover is displayed as progress via the GUI.

21. The apparatus of claim 20, wherein the program instructions include further program instructions to:
retrieve the recovery configuration stored in an encrypted database at the primary site; and
send the recovery configuration as clear text via a secure channel to the secondary site, wherein the recovery configuration includes credentials for authenticating access to the BSDs.

22. The apparatus of claim 20 wherein the program instructions include further program instructions to:
build a mapping from each UVM to a respective list of BSDs configured for attachment upon recovery at the secondary site, wherein the mapping is biased to provide connections between the UVM and BSDs according to the network interfaces to preserve expected network isolation and performance.

23. The apparatus of claim 20 wherein the recovery configuration is a periodically updated snapshot storage medium from the primary site to the secondary site.

24. The apparatus of claim 20 wherein recovery of the application includes authenticating access to the BSD at a hypervisor of the UVM to emulate a local disk for the application.

25. The apparatus of claim 20 wherein the recovery configuration includes (i) an authentication configuration of the BSDs specified in the recovery configuration, (ii) an iSCSI qualified name (iQN) of the specified BSDs, and (iii) a list of iSCSI attached clients to the specified BSDs.

26. The apparatus of claim 20, wherein the program instructions further include program instructions to:
generate a payload relating to each enumerated BSD entity, wherein a respective payload includes (i) an iSCSI qualified name (iQN) used at the secondary site, (ii) an authentication configuration, (iii) an authentication protocol, (iv) a block storage device to be recovered, and (v) an IP address of an iSCSI server used on the secondary site to connect to a respective BSD; and
use the payload to establish communication from the UVM at the secondary site to the iSCSI server to access the recovered block storage device.

27. The apparatus of claim 20, wherein the program instructions further include program instructions to:
generate a payload relating to each enumerated UVM entity, wherein the payload includes a generated iSCSI qualified name (iQN) used on the secondary site and a list of identifiers for associated BSDs on the primary site.

28. The apparatus of claim 20, wherein the program instructions further include program instructions to:
in response to an unplanned failover, recover the BSDs at the secondary site from a recovery point snapshot at the secondary site periodically updated from the primary site.

\* \* \* \* \*

UNITED STATES PATENT AND TRADEMARK OFFICE
CERTIFICATE OF CORRECTION

PATENT NO. : 12,255,769 B2  
APPLICATION NO. : 17/969399  
DATED : March 18, 2025  
INVENTOR(S) : Kartik Saraswat et al.

It is certified that error appears in the above-identified patent and that said Letters Patent is hereby corrected as shown below:

In the Specification

Column 6, Line 1:  
3600, e.g., memory storage capacity, networking capacity,

Should read:  
360a,b, e.g., memory storage capacity, networking capacity,

Signed and Sealed this  
Twenty-seventh Day of May, 2025

Coke Morgan Stewart  
*Acting Director of the United States Patent and Trademark Office*